(12) United States Patent
Kim et al.

(10) Patent No.: US 11,607,911 B2
(45) Date of Patent: Mar. 21, 2023

(54) NON-PNEUMATIC TIRE WITH STRUCTURAL REINFORCEMENT MEMBER IN TREAD PART

(71) Applicant: HANKOOK TIRE & TECHNOLOGY CO., LTD, Seongnam-si (KR)

(72) Inventors: Sung Tae Kim, Daejeon (KR); Seok Ju Choi, Daejeon (KR); Jeong Heon Kim, Daejeon (KR)

(73) Assignee: HANKOOK TIRE & TECHNOLOGY CO., LTD, Seongnam-si (KR)

( * ) Notice: Subject to any disclaimer, the term of this patent is extended or adjusted under 35 U.S.C. 154(b) by 302 days.

(21) Appl. No.: 17/031,134

(22) Filed: Sep. 24, 2020

(65) Prior Publication Data

US 2021/0086559 A1 Mar. 25, 2021

(30) Foreign Application Priority Data

Sep. 24, 2019 (KR) .......................... 10-2019-0117397

(51) Int. Cl.
*B60C 7/22* (2006.01)
*B60C 7/10* (2006.01)
*B60C 7/18* (2006.01)
*B60C 7/14* (2006.01)

(52) U.S. Cl.
CPC ................ *B60C 7/22* (2013.01); *B60C 7/102* (2013.01); *B60C 7/18* (2013.01); *B60C 7/146* (2021.08)

(58) Field of Classification Search
CPC .............. B60C 7/102; B60C 7/18; B60C 7/22
See application file for complete search history.

(56) References Cited

U.S. PATENT DOCUMENTS

| 9,272,576 | B2 | 3/2016 | Dotson et al. |
| 2016/0257170 | A1* | 9/2016 | Sugiya .................. B60C 9/2009 |
| 2018/0001704 | A1* | 1/2018 | Reinhardt ................ B60C 7/14 |
| 2020/0282772 | A1* | 9/2020 | Cron ........................ B60C 7/18 |

FOREIGN PATENT DOCUMENTS

| CN | 205768329 U | * 12/2016 | |
| EP | 3159184 A1 | * 4/2017 | ............ B60B 27/06 |
| JP | 2004074826 A | * 3/2004 | |
| JP | 4530231 B2 | 8/2010 | |
| JP | 4855646 B2 | 1/2012 | |
| KR | 10-2004-0027984 A | 5/2006 | |
| KR | 10-2006-0051513 A | 5/2006 | |
| KR | 10-2008-0038274 A | 5/2008 | |
| KR | 10-2010-0090015 A | 9/2010 | |
| KR | 2018025748 A | * 3/2018 | ............... B60C 7/14 |

* cited by examiner

*Primary Examiner* — Kip T Kotter
(74) *Attorney, Agent, or Firm* — Bridgeway IP Law Group, PLLC; Jihun Kim

(57) ABSTRACT

A non-pneumatic tire includes a rim part configured to be coupled to an axle; a tread part formed in a shape of surrounding an outer side of the tire in a circumferential direction thereof and being in contact with the ground; a spoke part which is formed between the rim part and the tread part and is provided with an upper arch bodies and lower arch bodies of an arch shape to absorb impacts transmitted from the ground to the tread part; and a structural reinforcement part which is inserted into the inside of the tread part and is provided with a cord sheet member comprising a plurality of wires to perform load support and stress distribution of the spoke part.

4 Claims, 7 Drawing Sheets

| ITEM (Index) 175/60R14 | EXAMPLES WITH/WITHOUT STRUCTURAL REINFORCEMENT PART | | |
|---|---|---|---|
| | COMPARATIVE EXAMPLE 1 | COMPARATIVE EXAMPLE 2 | EXAMPLE 1 |
| PRESENCE OF STRUCTURAL REINFORCEMENT PART | NO | YES | YES |
| CORD SHEET MATERIAL | - | PET 1000D/2 | ← |
| CONFIGURATION OF STRUCTURAL REINFORCEMENT PART | - | CUT IN CONSTANT WIDTH (100 mm) AND FORM 1,2 BELT | EXAMPLE OF INVENTION (SURROUNDING CONFIGURATION), WIDTH 100 mm |
| ANGLE BETWEEN FIRST AND SECOND CORD SHEET MEMBERS | - | 80 DEGREES IN OPPOSITE DIRECTION | ← |
| CORD GAP | - | 25.4EPI | ← |
| ACTUAL CONTACT AREA (Index) | 100 | 104 | 104 |
| SPOKE PART DEFORMATION DEGREE (Index) - DEFORMATION AMOUNT OF SPOKE PART LOCATED ALONG SHORTEST PATH FROM GROUND TO RIM PART (SMALL VALUE MEANS LESS DEFORMATION) | 100 | 83 | 82 |
| VERTICAL STATIC CHARACTERISTIC (Kv, Index) | 100 | 106 | 106 |
| RESISTANCE TO ROLLING (RRc, Index) | 100 | 101 | 101 |
| BRAKING PERFORMANCE (Index) | 100 | 104 | 105 |
| HIGH SPEED DURABILITY (PS01) | 4hr (TREAD-SPOKE INTERFACE DELAMINATION) | 7hr (BELT END DELAMINATION) | 9hr (SPOKE CRACK) |

FIG. 5

NON-PNEUMATIC TIRE WITH STRUCTURAL REINFORCEMENT MEMBER IN TREAD PART

BACKGROUND OF THE INVENTION

Field of the Invention

The present disclosure relates to a non-pneumatic tire, and more particularly, to a non-pneumatic tire provided with a structural reinforcement part in a tread thereof.

Description of the Related Art

Tires generally used in contemporary times may be classified into radial tires, bias tires, and solid tires according to their structure, and among them, the radial tires, that is, pneumatic tires, are widely used in motor vehicles excluding ones for a special purpose. However, the structure of such pneumatic tire is complex, and a comparatively large number of manufacturing processes, typically eight steps, are required. As a result of an increase in the number of manufacturing processes, a discharge amount of harmful substances is also increased. Furthermore, because the pneumatic pressure of the tire, which positively influences the performance and safety of the pneumatic tire, must be frequently checked, thus inconvenience of a user in terms of maintenance occurs. Moreover, there is the possibility of the tire being damaged by an external substance that may pierce the tire or apply an impact to it while the vehicle is moving.

Meanwhile, unlike the pneumatic tire, the non-pneumatic tire makes it possible to simplify the material and the manufacturing process, whereby the production cost can be markedly reduced. In addition, the non-pneumatic tire is one that is formed both with a structure and by processes of a new concept, which can dramatically reduce energy consumption and the amount of harmful substances discharged. Thus, the non-pneumatic tire is advantageous in that it is free from problems which may be caused by insufficient pneumatic. Furthermore, the non-pneumatic tire can prevent a standing wave phenomenon, which occurs in the pneumatic tire, and can markedly improve a characteristic of resistance to rolling.

However, due to its structural limitations, the conventional non-pneumatic tire has drawbacks regarding braking performance, fatigue resistance during high-speed driving, dispersion of vibrations, or resistance of torsional torque when a vehicle changes a direction.

In Korean Patent Application Publication No. 10-2006-0051513, a technique for supporting a load of a tire with a plurality of support members including a plurality of layers of staples is mentioned.

Korean Patent Application Publication No. 10-2008-0038274 refers to a technology consisting of a main body formed of an elastic material, a circumferentially elongated crown part serving as a tread, and an elongated sidewall bonded to the crown part.

In Korean Patent Application Publication No. 10-2004-0027984, a non-pneumatic tire, which includes a plurality of web spokes that transmits the load in a tensioned state between a reinforced annular band supporting the load of the tire and a wheel or hub is mentioned.

Korean Patent Application No. 10-2010-0090015 refers to a non-pneumatic tire having a buffer part formed in a honeycomb structure that functions as a buffer and supports a load applied to the tire.

In U.S. Pat. No. 9,272,576, a continuous loop reinforcement assembly is described, and as a structural reinforcement, a spiral wound coil type is introduced.

Japanese Patent No. 4855646 introduces a non-pneumatic tire having an elastomer shear layer and a ring-shaped reinforcement band inside and outside the radial direction of the elastomer shear layer.

In Japanese Patent No. 4530231, a non-pneumatic tire is introduced which is reinforced by the intermediate annular portion (inner annular portion) and the outer annular portion in the circumferential direction of the tire, wherein the reinforcement band of the outer annular portion may be formed by stacking steel cords, aramid cords, rayon cords, etc. arranged in parallel at an inclination angle of about 20 degrees so as to cross in the reverse direction.

CITATION LIST

Patent Literature

Patent Document 1: Korean Patent Application Publication No. KR 10-2006-0051513
Patent Document 2: Korean Patent Application Publication No. KR 10-2008-0038274
Patent Document 3: Korean Patent Application Publication No. KR 10-2004-0027984
Patent Document 4: Korean Patent Application No. KR 10-2010-0090015
Patent Document 5: U.S. Pat. No. 9,272,576
Patent Document 6: Japanese Patent No. 4855646
Patent Document 7: Japanese Patent No. 4530231

SUMMARY OF THE INVENTION

Accordingly, an objective of the present disclosure for addressing the above drawbacks is to improve braking performance and fatigue resistance during high-speed driving, while also improving the dispersion of vibration and resistance to torsional torque when a vehicle changes a direction, by inserting a structural reinforcement part into a tread part. Further, it is also an objective of the present disclosure to adjust the stiffness of an entire tire by changing the material kind or width of a cord sheet member of the structural reinforcement part.

Technical drawbacks, which the present disclosure is to address, are not limited to the aforementioned ones, and other technical drawbacks that are not mentioned may be clearly appreciated from the following detailed description by a person having ordinary skill in the art to which the present disclosure belongs.

In order to achieve aforementioned objectives, the present disclosure is intended to provide a non-pneumatic tire including a rim part in which an insertion groove is formed, the rim part to be connected with an axle; a tread part formed in a shape of surrounding an outer side of the tire in a circumferential direction thereof and being in contact with the ground; a spoke part which is formed between the rim part and the tread part and is provided with upper arch bodies and lower arch bodies of an arch shape to absorb impacts transmitted from the ground to the tread part; and a structural reinforcement part which is inserted into the inside of the tread part and is provided with a plurality of cord sheet members configured of a plurality of wires and diagonally crossed with each other, wherein the stiffness is adjusted by controlling the material of the structural reinforcement part and the width of the cord sheet member, and the braking performance and fatigue resistance of the tire is improved by inserting into the inside of the tread the structural reinforcement part in which a cord sheet member is wound around a center body.

In an embodiment of the present disclosure, the structural reinforcement part is further provided with a center body formed along a circumferential direction of the tread.

In an embodiment of the present disclosure, the structural reinforcement part may comprise a first cord sheet member and a second cord sheet member, the second cord sheet member may be wound around the center body at an angle of 40° to 85° to the circumferential direction of the tire, and the first cord sheet member may be wound around on an upper surface of the second cord sheet member while forming an angle of −40° to −85° to the circumferential direction of the tire.

In an embodiment of the present disclosure, a height between an inner surface of the structural reinforcement part and an outer surface of the spoke part may be 30% or less of the total height of the tread part.

In an embodiment of the present disclosure, the structural reinforcement part may be formed of one or more materials selected from the group consisting of polyamide-based fibers, polyester-based fibers, rayon fibers, aramid fibers, glass fibers, and carbon fibers.

In an embodiment of the present disclosure, the width of the cord sheet member may be 30 millimeters (mm) to 200 mm.

BRIEF DESCRIPTION OF THE DRAWINGS

FIG. 5 is a table of experimental data depending on whether the structural reinforcement part is applied in a non-pneumatic tire according to an embodiment of the present disclosure and the structure of a structural reinforcement part.

DETAILED DESCRIPTION OF THE PREFERRED EMBODIMENTS

Figure 1:
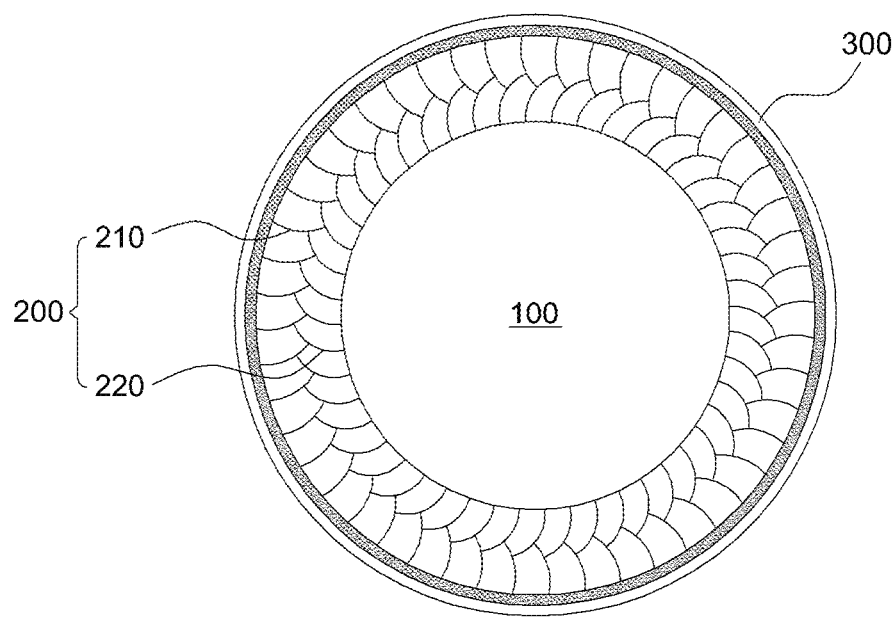
FIG. 1 is a cross-sectional view of a whole non-pneumatic tire according to an embodiment of the present disclosure.

Hereinafter, embodiments of the present disclosure will be described with reference to the accompanying drawings. However, the disclosure can be embodied in various different forms, and the scope of the disclosure should not be construed as being limited to the embodiments described herein. In the drawings, in order to describe clearly the invention, parts not related to the description are omitted, and like reference signs will be given to like constitutional element throughout the specification.

As used herein, "connecting (or combining)" a part with another part (or "bring" a part into contact or touch with another part) may refer to a case where they are "indirectly connected" to each other with other element intervening therebetween, as well as a case where they are "directly connected". Further, when a part "includes (or comprises)" a component, it does not mean that the part excludes other component, but means that the part may further include other component unless expressly stated to the contrary.

The terms used herein are used to merely describe specific embodiments, and are not intended to limit the disclosure. The singular forms may include the plural forms unless the context clearly indicates otherwise. The terms such as "include (or comprise)", "have (or be provided with)", and the like are intended to indicate that features, numbers, steps, operations, components, parts, or combinations thereof written in the following description are present, and thus should not be understood as that the possibility of existence or addition of one or more different features, numbers, steps, operations, components, parts, or combinations thereof is excluded in advance.

Hereinafter, the disclosure will be described in detail with reference to the accompanying drawings.

Figure 2A:
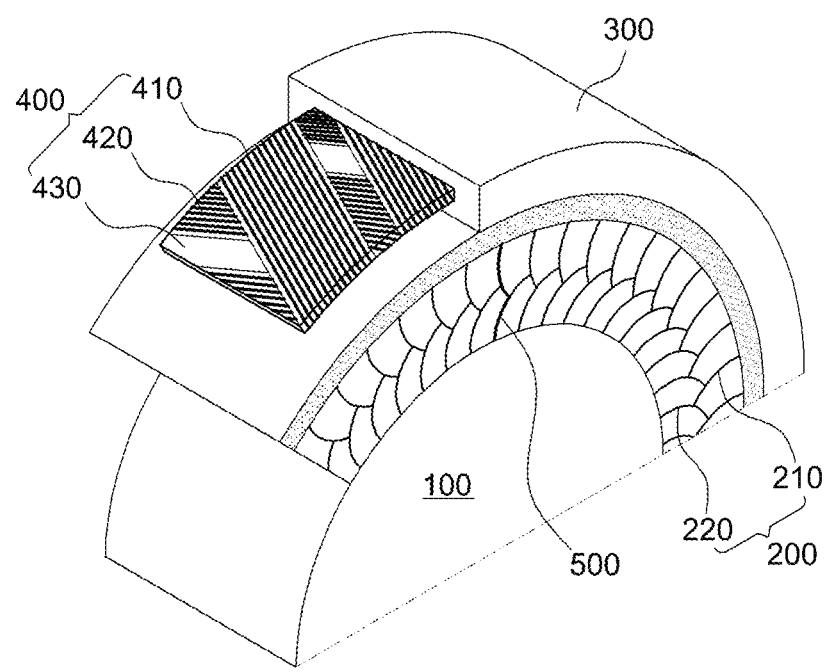
FIGS. 2a, 2b are a partially cutaway perspective view and a cross-sectional view of a non-pneumatic tire according to an embodiment of the present disclosure.
Figure 2B:
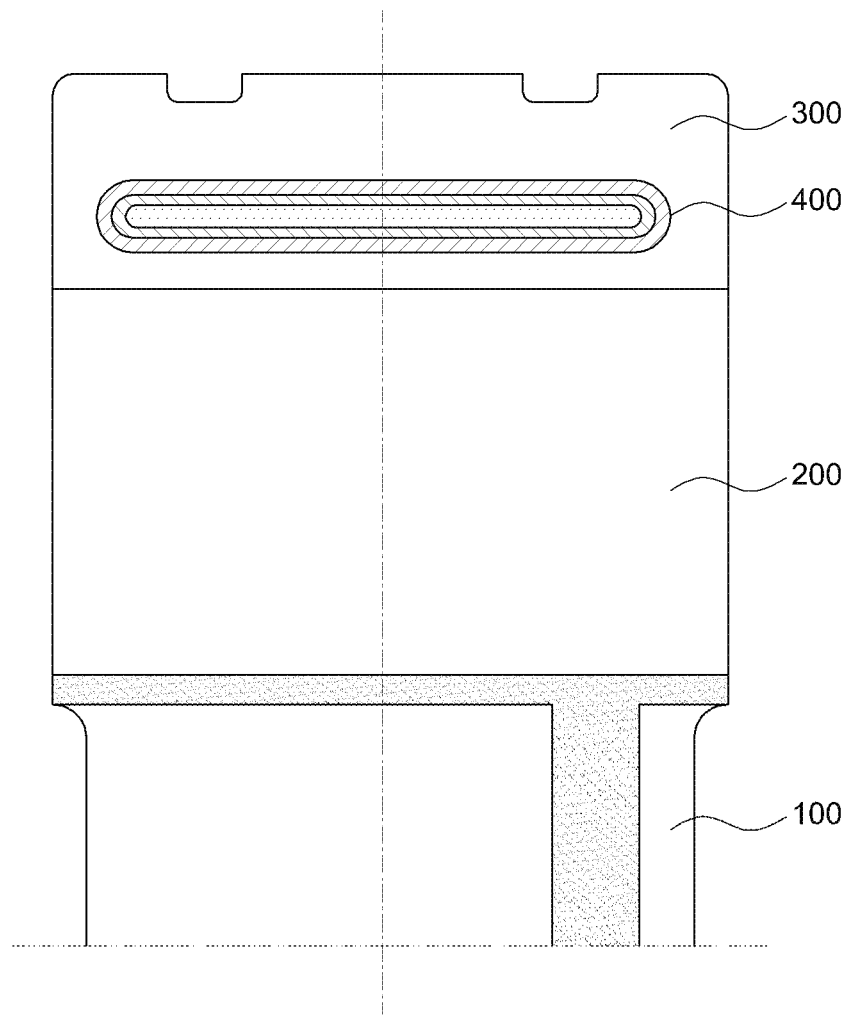
Figure 3:
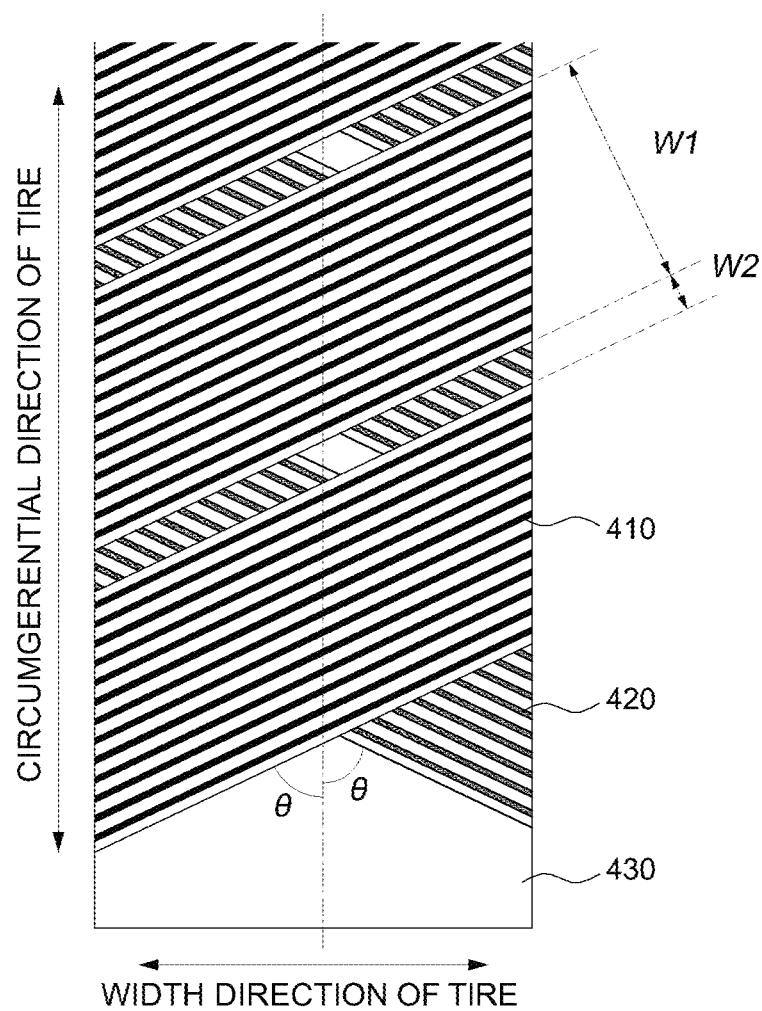
FIG. 3 is an enlarged view of a structural reinforcement part according to an embodiment of the present disclosure.

FIG. 1 is a front view illustrating a whole of a tire according to an embodiment of the present disclosure, FIG. 2a, 2b are a partially cutaway perspective view and a cross-sectional view schematically illustrating the structure of a tire according to an embodiment of the present disclosure, and FIG. 3 is an enlarged view of a structural reinforcement part 400 according to an embodiment of the present disclosure.

As shown in FIGS. 1 to 3, the non-pneumatic tire according to an embodiment of the present disclosure may include a rim part 100 provided with an insertion hole and configured to be connected with an axle, a tread part 300 formed in a shape of surrounding an outer side of the tire in a circumferential direction thereof and being in contact with the ground, a spoke part 200 which may be formed between the rim part 100 and the tread part 300 and is provided with an upper arch bodies 210 and lower arch bodies 220 of an arch shape to absorb impacts transmitted from the ground to the tread part 300, and a structural reinforcement part 400 which is inserted into the inside of the tread part 300 and is provided with a plurality of cord sheet members configured of a plurality of wires and diagonally crossed with each other.

The rim part 100 may be formed in a cylindrical shape, be coupled to an axle, and receive a driving force through the axle.

The tread part 300 may be formed to surround the outer surface of the spoke part 200 along the circumferential direction. The tread part 300 may alleviate impacts transmitted from the ground when coming in contact with the ground.

The spoke part 200 may be provided with the upper arch bodies 210 and lower arch bodies 220 of an arch shape. The upper arch bodies 210 is coupled to the inner surface of the tread part 300, and the lower arch bodies 220 is coupled to the outer surface of the rim part 100. In addition, the upper arch bodies 210 and the lower arch bodies 220 are alternately coupled with the corresponding upper arch bodies 210 and lower arch bodies 220 so that the upper and lower arch bodies connect the tread part 300 with the spoke part 200. The spoke part 200 may be formed of one material selected from an elastomer and a rubber material, and the spoke part 200 can absorb impacts transmitted from the ground to the tread part 300.

The structural reinforcement part 400 may be completely inserted into the tread part 300 and formed along the circumferential direction. The second cord sheet member 420 formed of the plurality of wires may be wound around on a center body at an angle of 40 to 85 degrees to the circumferential direction of the tire, and the first cord sheet member 410 formed of the plurality of wires may be wound around on the second cord sheet member 420 at an angle of −40 to −85 degrees to the circumferential direction of the tire. With this configuration, the edges of the structural reinforcement part 400 can be wrapped such that non-contact area between the cord sheet members does not occur, thus improving the durability of the tire. By setting the height from the inner surface of the structural reinforcement part 400 facing the center of the tire to the outer surface of the spoke part 200 in contact with the lower surface of the tread part 300 to be 30% or less of the total height of the tread part 300, it is possible to increase load support and stress distribution of the spoke part 200. Further, the structural reinforcement part 400 may have a width of 30 to 200 mm, and may be located at the center of the width direction. In the embodiment of the present disclosure, the structural reinforcement part including two cord sheet members is described, but the structural reinforcement part may include three or more cord sheet members.

The structural reinforcement part 400 may be formed of one or more materials selected from the group consisting of polyamide-based fibers, polyester-based fibers, rayon fibers, aramid fibers, glass fibers, and carbon fibers. In addition, the material of the first cord sheet member 410 and the material of the second cord sheet member 420 may have the same or different configurations. Additionally, the structural reinforcement part 400 may have a stiffness greater than that of the tread part 300. Also, a gap generated between cord sheet member sections when the cord sheet member is wound may be maintained between 0 and 5 mm. If the cord sheet member is overlapped or exceeds 5 mm to increase the empty space, the regular arrangement of the wires of the cord sheet member may be disturbed, thus reducing the durability. Further, when the cord sheet member is wound, the closer to 0° the angle of the cord sheet member with respect to the axial direction, the more effective it is to support the load in the circumferential direction. However, if the cord sheet member is wound at an angle less than 40°, regular winding may be difficult due to interference of the cord sheet members. In addition, as the angle at which the cord sheet member is wound is becomes smaller, the width of the cord sheet member w1 (see FIG. 3) should be wider in order to minimize the gap between the wound cord sheet member sections w2 (see FIG. 3). In this regard, if the width exceeds 200 mm, air may be trapped inside the cord sheet member during a tire manufacturing process, causing performance degradation.

In the non-pneumatic tire of the present disclosure, the widths of the first cord sheet member 410 and the second cord sheet member 420 may be the same or different from each other. By varying width of the first cord sheet member 410 and the width of the second cord sheet member 420, the overall stiffness of the structural reinforcement part 400 can be adjusted.

In the non-pneumatic tire of the present disclosure, the materials of the first cord sheet member 410 and the second cord sheet member 420 may be the same or different from each other. Respective cord sheet members may be formed of one or more materials of polyamide-based fibers, polyester-based fibers, rayon fibers, aramid fibers, glass fibers, and carbon fibers. Accordingly, the overall stiffness of the structural reinforcement part 400 can be adjusted.

Figure 4A:
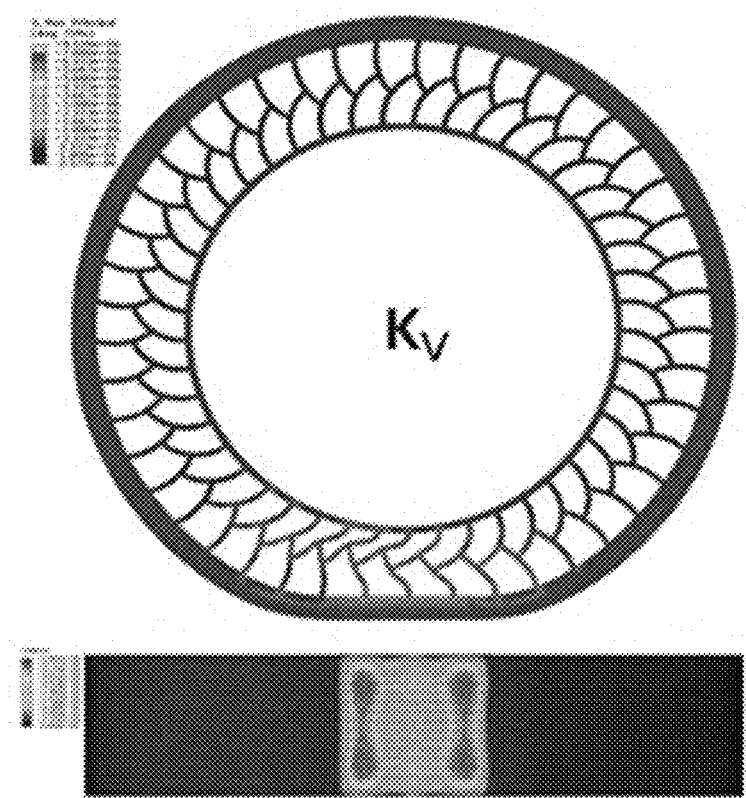
FIGS. 4a, 4b are views showing the degrees of deformation, which is one of the static characteristic performance evaluations, of a pneumatic tire and the embodiment of the present disclosure.
Figure 4B:
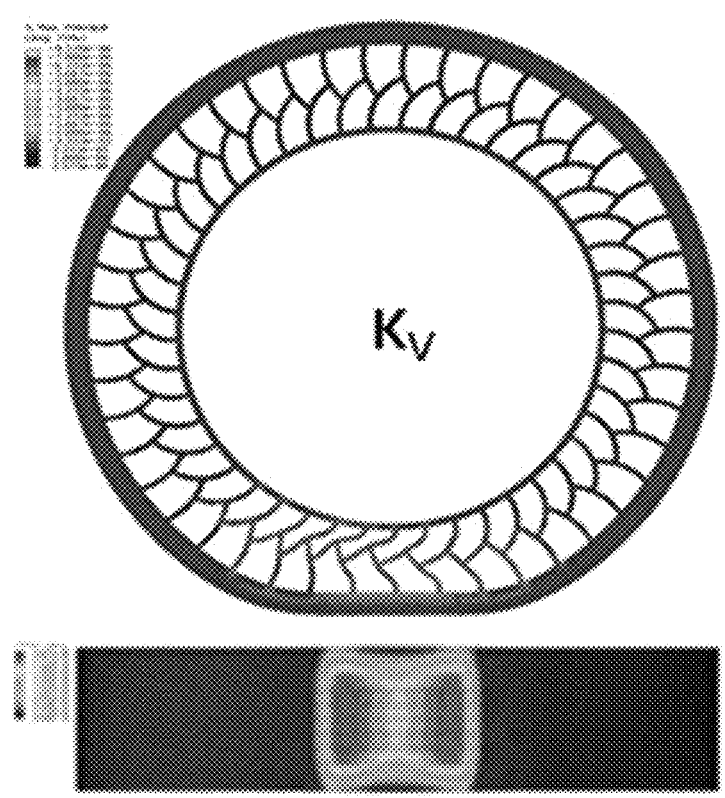

FIG. 4 is views showing the degrees of deformation, which is one of the static characteristic performance evaluations, of a non-pneumatic tire without the structural reinforcement and the embodiment of the present disclosure. In FIG. 4, (a) shows the degree of deformation of a non-pneumatic tire without the structural reinforcement part, and (b) shows the degree of deformation of the embodiment of the present disclosure.

As shown in FIG. 4, it can be confirmed that the degree of deformation in (b) of FIG. 4 is more similar to the degree of deformation of the pneumatic tire than the degree of deformation in (a) of FIG. 4. Accordingly, since the non-pneumatic tire provided with the structural reinforcement part can have similar performance to the pneumatic tire than the non-pneumatic tire without the structural reinforcement part, it can be said that the non-pneumatic tire provided with the structural reinforcement part has better ride comfort than the non-pneumatic tire without the structural reinforcement part.

Example 1

The structural reinforcement part 400 may be configured such that the first cord sheet member 410 formed of a plurality of wires and the second cord sheet member 420 formed of a plurality of wires form a layer configuration, in which the first cord sheet member 410 is wound around on the second cord sheet member 420. The cord sheet members may be formed of PET1000D/2, and have the width w1 (see FIG. 3) of 100 mm. In addition, the first cord sheet member 410 and the second cord sheet member 420 may be wound forming an angle of 60° in opposite directions, and the gap between the cord sheet member sections w2 (see FIG. 3) may be 25.4 EPI.

Comparative Example 2

In the structural reinforcement part 400, the first cord sheet member 410 formed of a plurality of wires may be combined onto an upper side of the center body 430, and the first cord sheet member 410 may be combined onto an upper side of the second cord sheet member 420. Further, the first cord sheet member 410 and the second cord sheet member 420 may be made of PET1000D/2, and the widths w1 of the first and second code members 410 and 420 (see FIG. 3) may be 100 mm. In addition, the first cord sheet member 410 and the second cord sheet member 420 may form an angle of 60° in opposite directions, and the gap between the cord sheet member sections w2 (see FIG. 3) may be 25.4 EPI.

Comparative Example 1

Non-pneumatic tire without structural reinforcement part inserted in the tread part.

FIG. 5 is a table of experimental data depending on whether the structural reinforcement part 400 is applied in a non-pneumatic tire according to an embodiment of the present disclosure and the structure of the structural reinforcement part 400. [Comparative Example 1] is an example in which the structural reinforcement part 400 is not inserted into the tread part 300, [Comparative Example 2] is an example in which the structural reinforcement part 400 is inserted into the inside of the tread part 300, but is configured of the second cord sheet member 420 combined onto the upper side of the center body 430, and the first cord sheet member 410 combined onto the upper side of the second cord sheet member, wherein the first and second cord sheet members are cut to have a constant width of 100 mm, and [Example 1] is an example of the present disclosure, wherein the widths of the first cord sheet member 410 and the second cord sheet member 420 are 100 mm. In [Comparative Example 2] and [Example 1], the materials of the respective cord sheet members are all PET 1000D/2. In addition, the gaps w2 (see FIG. 3) between the code member sheets of [Comparative Example 2] and [Example 1] are all uniformly 25.4 EPI.

As shown in FIG. 5, with regard to the high speed durability experiment, it can be confirmed that [Comparative Example 1] exhibits delamination generated at the interface between the tread part 300 and the spoke part 200 after 4 hours, that [Comparative Example 2] exhibits delamination of the end of the band formed as the cord sheet member after 7 hours, and that [Example 1] exhibits cracks generated in the spoke part 200 after 9 hours. Accordingly, it can be confirmed that [Example 1] exhibits improved braking performance and high speed durability of the spoke part 200 compared to [Comparative Example 1] and [Comparative Example 2].

In addition, as shown in FIG. 5, when the braking performance level of [Comparative Example 1] is set to 100, it can be confirmed that [Comparative Example 2] exhibits the braking performance value of 104, and that [Example 1] exhibits the braking performance value of 105. Accordingly, it can be confirmed that the braking performance of [Example 1] is the most excellent among [Comparative Example 1], [Comparative Example 2] and [Example 1].

And, as shown in FIG. 5, when the deformation amount of the spoke part 200 located along the shortest distance from the ground to the rim part 100 of [Comparative Example 1] is set to be 100 as reference, it can be confirmed that [Comparative Example 2] exhibits the deformation degree value of the spoke part 200 of 83, and that [Example 1] exhibits the deformation degree value of the spoke part 200 of 82. Therefore, it can be confirmed that the deformation degree of the spoke part 200 of [Example 1] in FIG. 5 is the smallest among [Comparative Example 1], [Comparative Example 2] and [Example 1]. Since decrease in the deformation degree of the spoke part 200 leads to reduction of vibration or noise during driving, it can be seen that the ride comfort and fatigue resistance of other parts in [Example 1] are better than those in [Comparative Example 1] and [Comparative Example 2].

The present disclosure according to the above-mentioned configurations may have an advantageous effect to improve the braking performance and fatigue resistance of the non-pneumatic tire by inserting the structural reinforcement part into the inside of the tread of the tire. Further, the present disclosure has an advantageous effect to improve the dispersion of vibration and resistance to torsional torque when a vehicle changes a direction.

In addition, it is also an advantageous effect of the present disclosure to adjust the stiffness by changing the material kind, width, or the like of the cord sheet member.

The effects of the present disclosure are not limited to the aforementioned effects, but should be understood as including all effects that can be inferred from the configuration provided by the detailed description or claims of the present application.

The aforementioned description of the present disclosure is merely an example, and a person having ordinary skill in the art to which the present disclosure pertains may understand that it can be easily modified into other specific configuration without changing the technical idea or essential features of the present disclosure. Thus, the embodiments described above should be construed not as limiting but as exemplary in every aspect. For example, the respective components described as a singular form may be implemented in a distributed form, and the respective components described in a distributed form may be implemented in a combined form.

The scope of the present disclosure is represented by the following claims, and all modifications and changes derived from the meaning and scope of the claims and equivalents thereof should be interpreted as being included in the scope of the present disclosure.

What is claimed is:

1. A non-pneumatic tire with a wheel assembly, the non-pneumatic tire comprising:
   a rim part configured to be connected to an axle;
   a tread part forming an outer side of the tire in a circumferential direction thereof and configured for being in contact with a ground;
   a spoke part disposed between the rim part and the tread part and including upper arch bodies and lower arch bodies to absorb impacts transmitted from the ground to the tread part; and
   a structural reinforcement part disposed in the tread part to perform load support and stress distribution of the spoke part,
   wherein the structural reinforcement part comprises:
   a center body arranged along a circumferential direction of the tread part;
   a plurality of first cord sheet members, each first cord sheet member including a plurality of wires; and
   a plurality of second cord sheet members, each second cord sheet member including a plurality of wires,
   wherein the plurality of second cord sheet members are directly wound around the center body at an angle of 40° to 85° to the circumferential direction of the tire and are arranged with a gap therebetween, and
   wherein the plurality of first cord sheet members are wound around on an upper surface of the plurality of second cord sheet members at an angle of −40° to −85° to the circumferential direction of the tire and are arranged with a gap therebetween.

2. The non-pneumatic tire of claim 1, wherein a height between an inner surface of the structural reinforcement part and an outer surface of the spoke part is 30% or less of the total height of the tread part.

3. The non-pneumatic tire of claim 1, wherein each cord sheet member of the structural reinforcement part is formed of one or more materials selected from a group consisting of polyamide-based fibers, polyester-based fibers, rayon fibers, aramid fibers, glass fibers, and carbon fibers.

4. The non-pneumatic tire of claim 1, wherein a width of each cord sheet member is 30 millimeters (mm) to 200 mm.

* * * * *